United States Patent
Lee et al.

(10) Patent No.: US 9,602,689 B2
(45) Date of Patent: Mar. 21, 2017

(54) PAPER RECEIVING DEVICE, IMAGE READING DEVICE, AND IMAGE FORMING APPARATUS

(71) Applicant: FUJI XEROX CO., LTD., Tokyo (JP)

(72) Inventors: Jingu Lee, Yokohama (JP); Geemyug Hyun, Yokohama (JP); Seungkeun Lim, Yokohama (JP); Junki Lee, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/804,620

(22) Filed: Jul. 21, 2015

(65) Prior Publication Data
US 2016/0277609 A1 Sep. 22, 2016

(30) Foreign Application Priority Data
Mar. 18, 2015 (JP) .................. 2015-054635

(51) Int. Cl.
*H04N 1/04* (2006.01)
*H04N 1/00* (2006.01)
(Continued)

(52) U.S. Cl.
CPC .......... *H04N 1/00588* (2013.01); *B65H 1/04* (2013.01); *B65H 7/04* (2013.01); *H04N 1/00689* (2013.01);
(Continued)

(58) Field of Classification Search
CPC .......... B65H 2511/51; B65H 2511/515; B65H 2801/39; B65H 2405/3321; B65H 2408/113; G03G 15/60; G03G 15/6508; G03G 15/6511; G03G 2215/00544; G03G 15/6502; G03G 2215/00329; G03G 2215/00725

USPC .............. 358/498, 474, 449, 497, 486, 496; 271/157, 265.01, 3.14, 147, 189, 225, 271/258.01, 10.01, 153, 155, 162, 163, 271/165, 213, 214, 264, 270, 274, 293, 271/294, 3.03, 3.15, 5, 97, 98, 9.01, 9.08, 271/9.09; 399/367, 81, 21, 23, 82, 107, 399/14, 361, 370, 376
See application file for complete search history.

(56) References Cited

U.S. PATENT DOCUMENTS 5,954,849 A * 9/1999 Berkhoel .......... B01D 46/0004
                                                             55/498
6,118,972 A * 9/2000 Yamazaki .......... G03G 15/607
                                                             399/370
(Continued)

FOREIGN PATENT DOCUMENTS

JP      H05-316279 A     11/1993
JP      2004-238158 A    8/2004

*Primary Examiner* — Negussie Worku
(74) *Attorney, Agent, or Firm* — Oliff PLC

(57) ABSTRACT

A paper receiving device includes a paper receiving member that receives a paper sheet; a first detector that detects whether or not a size of the paper sheet received by the paper receiving member is greater than a first size; a second detector that detects whether or not the size of the paper sheet received by the paper receiving member is smaller than a second size that is smaller than the first size; and an open-state detector that detects that the paper receiving device is opened when the first detector detects that the size of the paper sheet is greater than the first size and the second detector detects that the size of the paper sheet is smaller than the second size.

14 Claims, 11 Drawing Sheets

(51) Int. Cl.
   *B65H 1/04*   (2006.01)
   *B65H 7/04*   (2006.01)

(52) U.S. Cl.
   CPC ..... *H04N 1/00692* (2013.01); *H04N 1/00694* (2013.01); *H04N 1/00702* (2013.01); *H04N 1/00708* (2013.01); *H04N 1/00732* (2013.01); *H04N 1/00771* (2013.01); *B65H 2511/417* (2013.01); *B65H 2511/51* (2013.01); *B65H 2511/515* (2013.01); *B65H 2801/39* (2013.01); *H04N 2201/0081* (2013.01); *H04N 2201/0082* (2013.01); *H04N 2201/0094* (2013.01); *H04N 2201/0422* (2013.01)

(56) References Cited

U.S. PATENT DOCUMENTS

| | | | | |
|---|---|---|---|---|
| 6,203,003 B1* | 3/2001 | Sato | ............... | G03G 15/60 271/10.01 |
| 6,298,778 B1* | 10/2001 | Onodera | ............... | B41L 21/02 101/116 |
| 6,539,199 B1* | 3/2003 | Miyata | ............... | G03G 15/65 347/248 |
| 6,809,946 B2* | 10/2004 | Fujisawa | ............... | G11C 7/06 365/230.03 |
| 9,013,769 B1* | 4/2015 | Osakabe | ............... | 358/474 |
| 2006/0193013 A1* | 8/2006 | Hoshi | ............... | H04N 1/00708 358/474 |
| 2006/0261544 A1* | 11/2006 | Tamura | ............... | B65H 9/004 271/303 |
| 2007/0153325 A1* | 7/2007 | Mizumukai | ............... | H04N 1/00572 358/1.15 |
| 2007/0201893 A1* | 8/2007 | Yamazaki | ............... | G03G 15/238 399/82 |
| 2010/0214619 A1* | 8/2010 | Sudo | ............... | H04N 1/3875 358/3.24 |
| 2013/0033667 A1* | 2/2013 | Yanagisawa | ............... | G02F 1/1339 349/139 |
| 2015/0266686 A1* | 9/2015 | Kawamata | ............... | B65H 7/06 271/265.01 |
| 2015/0278648 A1* | 10/2015 | Murata | ............... | G06K 15/16 358/1.12 |
| 2015/0336759 A1* | 11/2015 | Tsuyuki | ............... | B65H 7/18 271/258.01 |
| 2016/0121633 A1* | 5/2016 | Tanisaki | ............... | B41J 13/0036 271/9.01 |

* cited by examiner

FIG. 11

| FIRST SIZE DETECTION SENSOR | SECOND SIZE DETECTION SENSOR | DETERMINATION |
|---|---|---|
| 0 | 0 | DADF CLOSE |
| 0 | 1 | DADF CLOSE |
| 1 | 0 | DADF OPEN |
| 1 | 1 | DADF CLOSE |

PAPER RECEIVING DEVICE, IMAGE READING DEVICE, AND IMAGE FORMING APPARATUS

CROSS-REFERENCE TO RELATED APPLICATIONS

This application is based on and claims priority under 35 USC 119 from Japanese Patent Application No. 2015-054635 filed Mar. 18, 2015.

BACKGROUND

Technical Field

The present invention relates to a paper receiving device, an image reading device, and an image forming apparatus.

SUMMARY

According to an aspect of the invention, there is provided a paper receiving device including a paper receiving member that receives a paper sheet; a first detector that detects whether or not a size of the paper sheet received by the paper receiving member is greater than a first size; a second detector that detects whether or not the size of the paper sheet received by the paper receiving member is smaller than a second size that is smaller than the first size; and an open-state detector that detects that the paper receiving device is opened when the first detector detects that the size of the paper sheet is greater than the first size and the second detector detects that the size of the paper sheet is smaller than the second size.

BRIEF DESCRIPTION OF THE DRAWINGS

An exemplary embodiment of the present invention will be described in detail based on the following figure, wherein:

FIG. 11 is a truth table of the operation of the image forming apparatus including the paper receiving device according to the exemplary embodiment of the present invention.

DETAILED DESCRIPTION

An exemplary embodiment of the present invention will now be described with reference to the drawings.

Exemplary Embodiment

Figure 1:
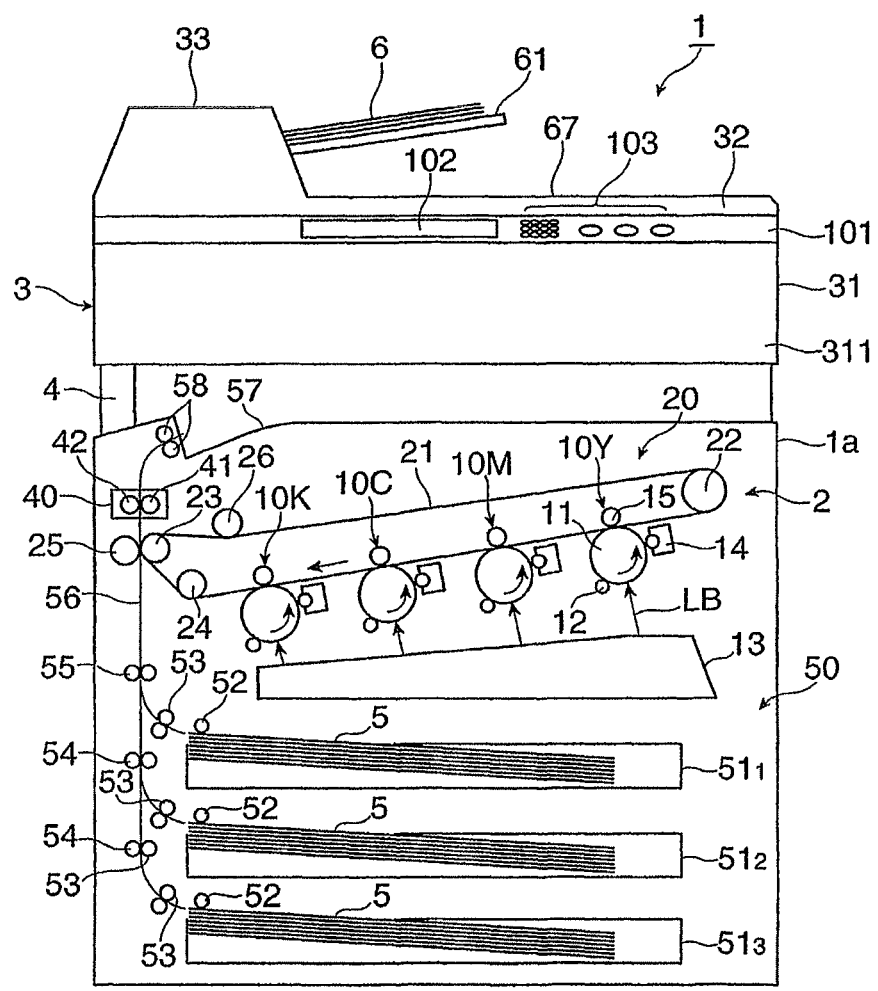
FIG. 1 illustrates the overall structure of an image forming apparatus including a paper receiving device and an image reading device according to an exemplary embodiment of the present invention.

FIG. 1 illustrates the overall structure of an image forming apparatus 1 including a paper receiving device and an image reading device 3 according to an exemplary embodiment of the present invention.

Overall Structure of Image Forming Apparatus

The image forming apparatus 1 according to the exemplary embodiment is, for example, a color copier. The image forming apparatus 1 includes the image reading device 3 that reads images on document sheets 6, and an image forming section 2 that serves as an image forming unit that forms an image on a recording medium on the basis of image data. The image reading device 3 is supported by a support 4 at a location above an apparatus body 1a that houses the image forming section 2. A space for receiving the recording medium after the image is formed thereon is provided between the image reading device 3 and the apparatus body 1a.

Figure 4:
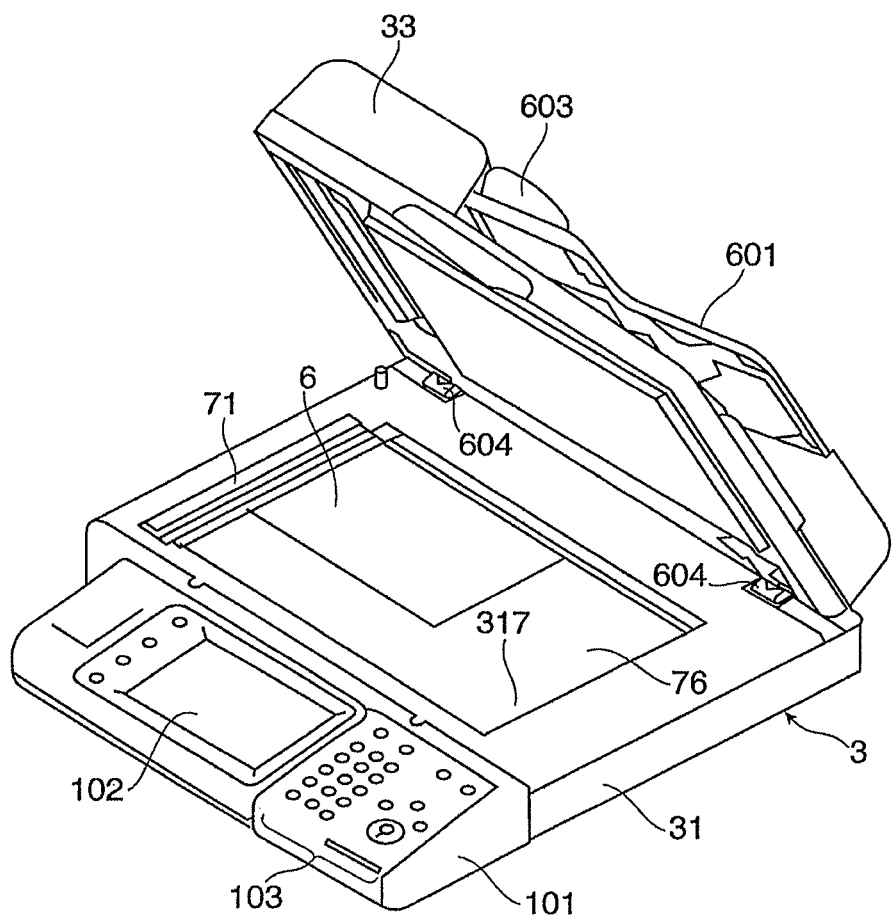
FIG. 4 is a perspective view illustrating the duplex automatic document feeder in an opened state.

As illustrated in FIGS. 1 and 4, the image reading device 3 includes a control panel 101 on an upper portion of a front wall 311 at the front side of a housing 31 of the image reading device 3. The control panel 101 serves as an operation unit for operating the image forming apparatus 1 and the image reading device 3. The control panel 101 also serves as a display unit that displays an operation menu, a warning, a message, etc., for a user, and includes a touch panel 102 and plural operation buttons 103 for receiving, for example, various settings related to the displayed operation menu.

As illustrated in FIG. 1, the image forming section 2 includes plural image forming devices 10, an intermediate transfer device 20, a paper feeding device 50, and a fixing device 40. Each image forming device 10 forms a toner image that is developed with toner contained in developer. The intermediate transfer device 20 carries toner images formed by the image forming devices 10 and transports the toner images to a second transfer position at which the toner images are transferred onto a recording sheet 5, which is an example of a recording medium, in a second transfer process. The paper feeding device 50 contains and transports the recording sheet 5 to be supplied to the second transfer position of the intermediate transfer device 20. The fixing device 40 fixes the toner images that have been transferred onto the recording sheet 5 by the intermediate transfer device 20 in the second transfer process. The apparatus body 1a includes, for example, a supporting structural member and an external covering part.

The paper feeding device 50 is disposed below an exposure device 13. The paper feeding device 50 basically includes plural paper containers $51_1$ to $51_3$ (or a single paper container) which each contain recording sheets 5 of the desired size, type, etc., in a stacked manner and transporting devices 52 an 53 that feed the recording sheets 5 one at a time from the paper containers 51₁ to 51₃. Each paper container 51 is, for example, attached to the apparatus body 1a such that the paper container 51 may be pulled out toward the front side (side that faces the user during operation) of the apparatus body 1a.

Plural paper transport rollers 54 and 55, which transport each of the recording sheets 5 fed from the paper feeding device 50 to the second transfer position, and a paper transport path 56 having transport guide members (not shown) are provided between the paper feeding device 50 and the intermediate transfer device 20. The paper transport rollers 55 that are disposed immediately in front of the second transfer position along the paper transport path 56 serve as, for example, registration rollers for adjusting the time at which each recording sheet 5 is to be transported. Output rollers 58, which output the recording sheet 5 to the output paper receiver 57, are arranged downstream of the fixing device 40 in the direction in which the recording sheet 5 is transported.

The image forming devices 10 include four image forming devices 10Y, 10M, 10C, and 10K that respectively form toner images of four colors, which are yellow (Y), magenta (M), cyan (C), and black (K). Each image forming device 10 (Y, M, C, or K) includes a photoconductor drum 11 that rotates and serves as an example of an image carrier; a charging device 12 that charges a peripheral surface (image carrying surface) of the photoconductor drum 11, on which an image may be formed, to a certain potential; the exposure device 13 that irradiates the charged peripheral surface of the photoconductor drum 11 with light LB based on image information (signal) to form an electrostatic latent image (for the corresponding color) having a potential difference; a developing device 14 that forms a toner image by developing the electrostatic latent image with toner of the corresponding color (Y, M, C, or K); a first transfer device 15 that serves as an example of a first transfer unit that transfers the toner image onto the intermediate transfer device 20 in a first transfer process; and a drum cleaning device (not shown) that cleans the image carrying surface of the photoconductor drum 11 by removing the substances, such as toner, that remain on the image carrying surface after the first transfer process.

The intermediate transfer device 20 includes an intermediate transfer belt 21 and plural transport rollers 22 to 24 and 26 that transport the intermediate transfer belt 21 in the direction shown by the arrow. A second transfer device 25, which performs the second transfer process in which the toner images on the intermediate transfer belt 21 are simultaneously transferred onto the recording sheet 5, is arranged so as to be in contact with the intermediate transfer belt 21 and face the transport roller 23 with the intermediate transfer belt 21 interposed therebetween.

The fixing device 40 includes a heating rotating body 41 and a pressing rotating body 42. Contact portions of the heating rotating body 41 and the pressing rotating body 42 form a fixing process unit that fixes the toner images to the recording sheet 5.

Basic Operation of Image Forming Apparatus

A basic image forming operation performed by the image forming apparatus 1 will now be described.

An image forming operation for forming a full-color image by combining toner images of four colors (Y, M, C, and K) by using the four image forming devices 10 (Y, M, C, and K) will be described.

When the image forming apparatus 1 receives command information of a request for the image forming operation (printing), the four image forming devices 10 (Y, M, C, and K), the intermediate transfer device 20, the second transfer device 25, and the fixing device 40 are activated.

The image forming devices 10 (Y, M, C, and K) form toner images of the four colors (Y, M, C, and K) that are developed with the toners of the respective colors. When the toner images of the respective colors formed by the image forming devices 10 (Y, M, C, and K) reach the respective first transfer positions, the first transfer devices 15 perform the first transfer process so that the toner images of the respective colors are successively transferred, in a superimposed manner, onto the intermediate transfer belt 21 of the intermediate transfer device 20 that rotates in the direction shown by the arrow. In the intermediate transfer device 20, the intermediate transfer belt 21 rotates so as to transport the toner images that have been transferred onto the intermediate transfer belt 21 in the first transfer process to the second transfer position. The paper feeding device 50 feeds the recording sheet 5 to the paper transport path 56 in accordance with the image forming process. The paper transport rollers 55, which serve as registration rollers, transport the recording sheet 5 along the paper transport path 56 to the second transfer position in accordance with the transfer timing.

At the second transfer position, the second transfer device 25 performs the second transfer process in which the toner images on the intermediate transfer belt 21 are simultaneously transferred onto the recording sheet 5. In the intermediate transfer device 20 after the second transfer process, the belt cleaning device (not shown) cleans the surface of the intermediate transfer belt 21 by removing the substances, such as toner, that remain on the surface after the second transfer process.

The recording sheet 5, onto which the toner images have been transferred in the second transfer process, is released from the intermediate transfer belt 21 and the second transfer device 25 and transported to the fixing device 40. In the fixing device 40, a fixing process (heating and pressing) is performed so that the unfixed toner images are fixed to the recording sheet 5. The recording sheet 5 that has been subjected to the fixing process is discharged by the output rollers 58 to the output paper receiver 57 arranged in, for example, the apparatus body 1a.

As a result of the above-described operation, the recording sheet 5 on which a full-color image is formed by combining the toner images of four colors together is output.

Structure of Image Reading Device

Figure 2:
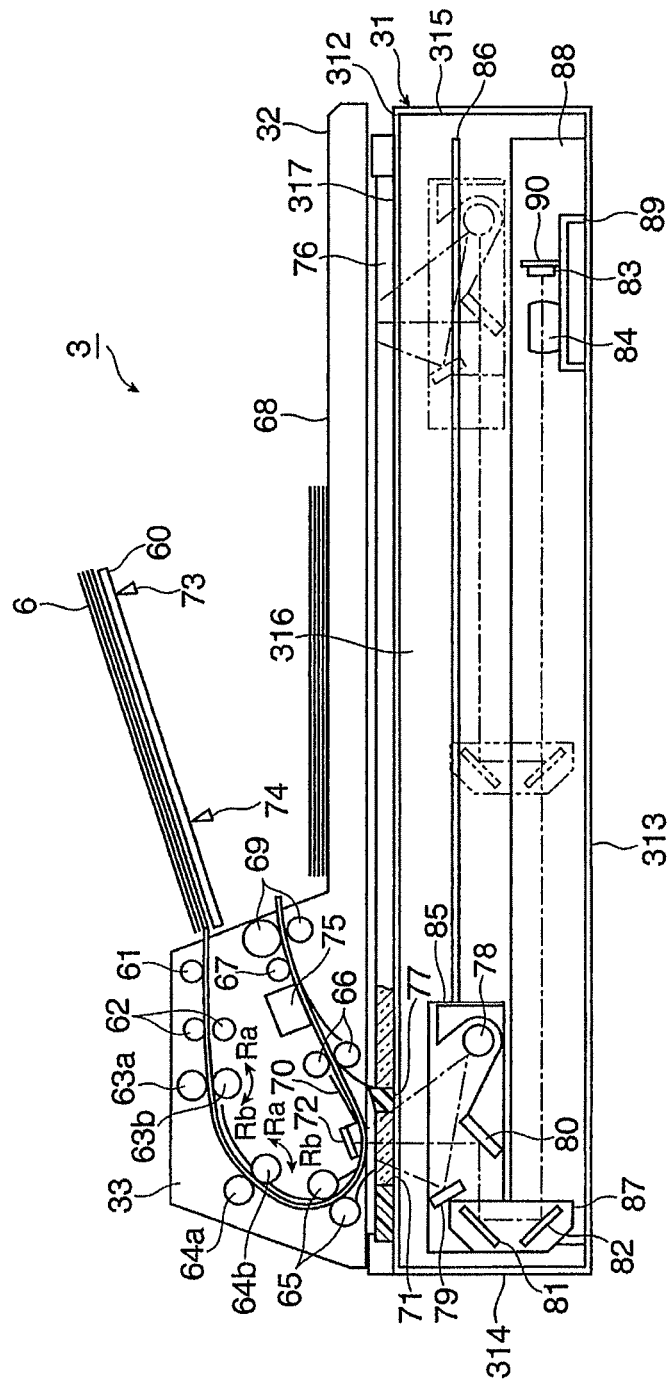
FIG. 2 is a sectional view illustrating the structure of the image reading device according to the exemplary embodiment of the present invention.

FIG. 2 is a schematic diagram illustrating the structures of a duplex automatic document feeder including the paper receiving device according to the present exemplary embodiment and the image reading device.

The image reading device 3 basically includes the housing 31 having a document reading surface at the top, a document pressing cover 32 attached to the housing 31 in such a manner that the document pressing cover 32 may be opened or closed, and a duplex automatic document feeder (DADF) 33 provided at one end of the document pressing cover 32.

The image reading device 3 may be switched between a first reading mode and a second reading mode in response to an operation performed by the user. In the first reading mode, the document sheets 6 are read while being automatically transported one at a time by the duplex automatic document feeder (DADF) 33. In the second reading mode, the document sheets 6 are read while being placed on a document table 76, which will be described below. FIG. 2 illustrates components in the state in which the document sheets 6 are read in the first reading mode.

The duplex automatic document feeder (DADF) 33 includes a document receiver 60, which is an example of a paper receiving device that receives the document sheets 6 in a stacked state, and a document transporting mechanism. The document transporting mechanism includes a feed roller 61 that feeds the document sheets 6 from the document receiver 60, separation rollers 62 that separate the document sheets 6 fed by the feed roller 61 from each other, transport rollers 63 to 67 that transport the document sheets 6 to a document reading position, and output rollers 69 that output the document sheets 6 to an output document receiver 68. The feed roller 61, the separation rollers 62, the transport rollers 63 to 67, and the output rollers 69 are driven by a driving unit (not shown) when the document sheets 6 are read. The transport rollers 64 function as registration rollers, and the transport rollers 63, which are disposed upstream of the transport rollers 64, function as pre-registration rollers. The transport roller 67 presses the top surfaces (back surfaces) of the document sheets 6.

The transport rollers 63 and 64, which are arranged in a transporting direction in which the document sheets 6 are transported, function as a correction unit for mechanically correcting skewing of each document sheet 6 relative to the transporting direction. The transport rollers 63, which are located in an upstream region in the transporting direction of the document sheets 6, include a transport roller 63b that functions as a driving roller and a transport roller 63a that functions as a driven roller. As illustrated in FIG. 2, the transport roller 63b is rotatable in a forward direction Ra and a reverse direction Rb by a driving unit, such as a drive motor (not shown). The transport roller 63a is rotated by the rotation of the transport roller 63b while being pressed against the transport roller 63b. Here, the rotational direction of the transport roller 63b is opposite to the rotational direction of the transport roller 63a.

Similarly, the transport rollers 64, which are located in a downstream region in the transporting direction of the document sheets 6, include a transport roller 64b that functions as a driving roller and a transport roller 64a that functions as a driven roller. The transport roller 64b is rotatable in a forward direction Ra and a reverse direction Rb by a driving unit, such as a drive motor (not shown). The transport roller 64a is rotated by the rotation of the transport roller 64b while being pressed against the transport roller 64b. Here, the rotational direction of the transport roller 64b is opposite to the rotational direction of the transport roller 64a.

The transport rollers 63 form a mechanical skew correction unit that corrects skewing of the transported document sheet 6 relative to the transporting direction by causing the leading end of the document sheet 6 to come into contact with the downstream transport rollers 64 in a stationary state so that the document sheet 6 is bent (hereinafter referred to as "skew correction"). Similarly, the transport rollers 64 form a mechanical skew correction unit that corrects skewing of the transported document sheet 6 relative to the transporting direction by causing the leading end of the document sheet 6 to come into contact with the downstream transport rollers 65 in a stationary state so that the document sheet 6 is bent. The transport rollers 63 and 64 are controlled by a controller so as to perform the mechanical skew correction only when necessary. Therefore, the transport rollers 63 and 64 are normally rotated in the forward direction Ra. It is not necessary that the skew correction for each document sheet 6 be performed in two steps by the transport rollers 63 and 64, and the skew correction for each document sheet 6 may instead be performed only by the transport rollers 63 or the transport rollers 64.

The duplex automatic document feeder (DADF) 33 also includes a curved reading guide 70 that guides each document sheet 6 to a reading position and also guides the document sheet 6 from the reading position in an output direction; a plate-shaped regular reflector 72 that is provided on the reading guide 70 at a location above a reading window 71 and serves as a backing plate for the document sheet 6; a first size detection sensor 73 that serves as an example of a first detector for detecting the size of the document sheet 6 in a second scanning direction; a second size detection sensor 74 that serves as an example of a second detector for detecting the size of the document sheet 6 in the second scanning direction; and a back-side reading unit 75 that reads an image on the back side of the document sheet 6 as necessary.

In the present exemplary embodiment, the first size detection sensor 73 and the second size detection sensor 74 are provided on the document receiver 60, which is an example of a paper receiving device.

The housing 31 of the image reading device 3 is a rectangular-parallelepiped-shaped box having an opening in a top end surface thereof. The housing 31 includes a top wall 312 that opposes the document pressing cover 32, a bottom wall 313 that opposes the top wall 312, side walls 314 and 315 that oppose each other with the bottom wall 313 disposed therebetween in the second scanning direction (left-right direction in FIG. 2), the above-described front wall 311 (see FIG. 1), and a back wall 316 that opposes the front wall 311 in a first scanning direction (direction perpendicular to the page in FIG. 2).

The top wall 312 of the housing 31 has an opening 317 at a position corresponding to the document reading position at which each document sheet 6 is read in the second reading mode. The document table 76 (platen glass), which is transparent and supports the document sheet 6, is disposed in the opening 317. The reading window 71, which is transparent and through which each document sheet 6 is read in the first reading mode, is provided near an end of the document table 76 that is closer to the duplex automatic document feeder (DADF) 33. A guide member 77, which guides the document sheet 6 in the first reading mode, is disposed between the reading window 71 and the document table 76.

The image reading device 3 includes a light source 78, a reflector 79, a first mirror 80, a second mirror 81, a third mirror 82, and an image reading unit, which are disposed in the housing 31. The light source 78 includes an illumination lamp, a light emitting electrode (LED), or the like which emits light for irradiating the document sheet 6. The reflector 79 serves as a reflecting member that reflects a part of the light emitted from the light source 78 toward the document sheet 6. The first mirror 80 receives the light reflected by the document sheet 6. The second mirror 81 receives the light reflected by the first mirror 80. The third mirror 82 receives the light reflected by the second mirror 81. The image reading unit includes an imaging lens 84 that focuses the light reflected by the third mirror 82 on an image reading element 83 such as a charge-coupled device (CCD). The light source 78, the reflector 79, and the first to third mirrors 80 to 82 are arranged so as to extend in the first scanning direction (direction perpendicular to the page in FIG. 2). The light source 78 emits light toward the regular reflector 72 and the reflector 79.

The light source 78, the reflector 79, and the first mirror 80 extend in the first scanning direction, and are fixed to a first moving body 85 formed of a carriage that is movable in the second scanning direction. The first moving body 85 is guided by a first rail 86 provided on the back wall 316 of the housing 31 so as to extend in the second scanning direction, and illuminates a target region of the document sheet 6 while moving in the second scanning direction. The light reflected by the document sheet 6 is reflected toward the second mirror 81, which is provided on a second moving body 87, by the first mirror 80.

The second mirror 81 and the third mirror 82 are arranged so as to extend in the first scanning direction, and are fixed to the second moving body 87, which is formed of a carriage that is movable in the second scanning direction. The second moving body 87 is guided by a second rail 88 provided on the bottom wall 313 of the housing 31 so as to extend in the second scanning direction, and reflects the light reflected by the document sheet 6 toward the imaging lens 84 of the image reading unit while moving in the second scanning direction. The first rail 86 and the second rail 88 are arranged so as to oppose each other at both ends in the first scanning direction.

In the image reading unit, the lens 84 and a substrate 90, on which the image reading element 83 is mounted, are fixed to a base plate 89 supported by the bottom wall 313. The image reading unit is structured such that the light reflected by the third mirror 82 passes through the imaging lens 84 and is focused on the image reading element 83, such as a CCD, and the image reading element 83 reads the image on the document sheet 6 and outputs image data.

In the second reading mode, the first moving body 85 and the second moving body 87 are driven by a driving mechanism (not shown). While the first moving body 85 is moved in the second scanning direction, the second moving body 87 is moved such that the amount of movement thereof is half the amount of movement of the first moving body 85, so that the optical path length from the image reading position of the document sheet 6 to the image reading element 83, which will be described below, does not change. In FIG. 2, the two-dot chain line shows the positions of the first moving body 85 and the second moving body 87 in a state in which the first moving body 85 has been moved to a position near an end of the document sheet 6 in the second scanning direction.

Structure of Paper Receiving Device

Figure 3:
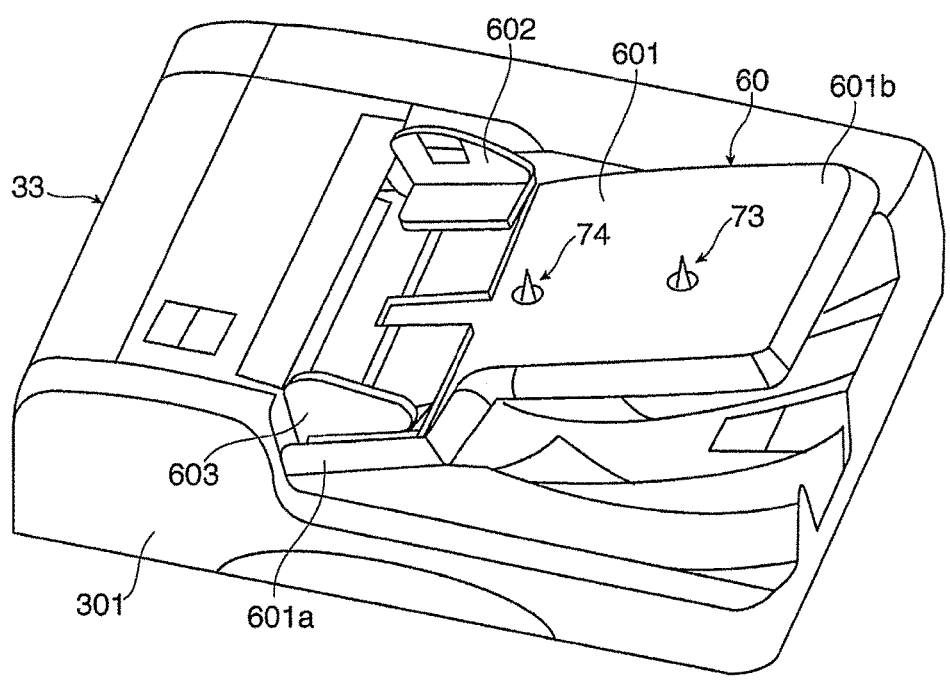
FIG. 3 is a perspective view of a duplex automatic document feeder.

As illustrated in FIG. 3, the document receiver 60, which is an example of a paper receiving device, includes a document receiving member 601 that receives the document sheets 6 in a stacked state. The document receiving member 601 is a substantially plate-shaped member that is bent toward the back side at the periphery thereof. The document receiving member 601 is obliquely arranged at a small angle such that a proximal end portion 601*a* thereof at a sheet-feeding side is attached to the housing 301 of the duplex automatic document feeder (DADF) 33 and a distal end portion 601*b* thereof is located above the housing 301 of the duplex automatic document feeder (DADF) 33. Side guides 602 and 603, which are an example of guide members, are provided on the proximal end portion 601*a* of the document receiving member 601. The side guides 602 and 603 are brought into contact with the ends of the document sheets 6 in the first scanning direction (direction that crosses the transporting direction), detect the size of the document sheets 6 in the first scanning direction, and guide the document sheets 6 in the transporting direction. In the present exemplary embodiment, a so-called center registration method is employed in which the document sheets 6 are transported by using the center thereof in the first scanning direction as a reference. The side guides 602 and 603 are moveable toward and away from each other in accordance with the size of the document sheets 6 in the first scanning direction.

As illustrated in FIG. 4, the housing 301 of the duplex automatic document feeder (DADF) 33, to which the document receiving member 601 is attached, is attached to the housing 31 of the image reading device 3 such that the housing 301 may be opened or closed by being rotated around a fulcrum 604 provided at the back side of the housing 31 of the image reading device 3.

In addition, as illustrated in FIG. 3, first and second size detection sensors 73 and 74 for detecting the size of the document sheets 6 in the second scanning direction (transporting direction of the document sheets 6) are provided on the document receiving member 601 in a central region of the document sheets 6 in the first scanning direction. The first size detection sensor 73 is disposed adjacent to an outer side of the document sheets 6 when the size of the document sheets 6 have a is A4 and the document sheets 6 are placed on the document receiving member 601 such that a short side thereof is at the leading end in the transporting direction. The first size detection sensor 73 detects whether or not the size of the document sheets 6 is large. The second size detection sensor 74 is disposed adjacent to an inner side of the document sheets 6 when the size of the document sheets 6 is A4 and the document sheets 6 are placed on the document receiving member 601 such that a long side thereof is at the leading end in the transporting direction. The second size detection sensor 74 detects whether or not the size of the document sheets 6 is small.

Figure 5A:
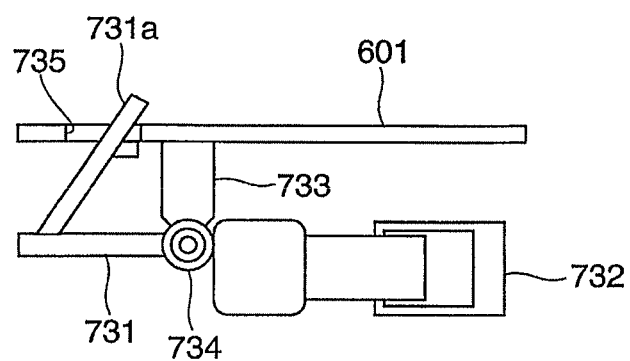
FIGS. 5A and 5B illustrate the structure of a portion of the paper receiving device according to the exemplary embodiment of the present invention.
Figure 5B:
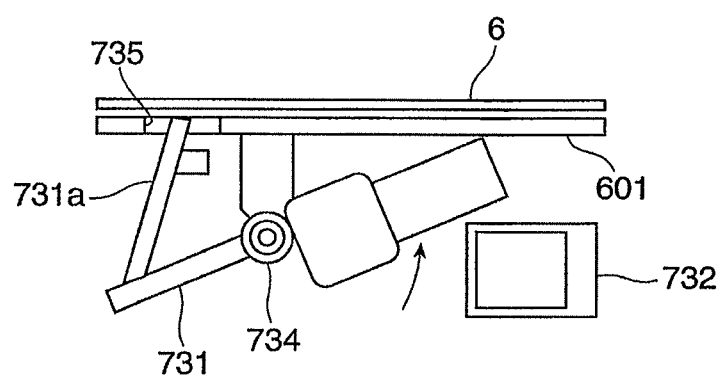

The first and second size detection sensors 73 and 74 are arranged on the back side of the document receiving member 601, and basically have a similar structure. As illustrated in FIGS. 5A and 5B, the first size detection sensor 73 includes a first actuator 731, which serves as a displacement member that moves when it comes into contact with the document sheets 6 received by the document receiving member 601, and a first optical sensor 732, which is an example of a detection member that optically detects the position of the first actuator 731.

The first actuator 731 is attached to a support member 733, which is fixed to the back side of the document receiving member 601, such that the first actuator 731 is rotatable around a fulcrum 734. In the state in which no document sheets 6 are received by the document receiving member 601, a distal end portion 731*a* of the first actuator 731 slightly projects from an opening 735 formed in the document receiving member 601. In the state in which the document sheets 6 are received by the document receiving member 601, the distal end portion 731*a* comes into contact with the back side of the stack of document sheets 6 on the document receiving member 601 and is pushed downward, and thereby the first actuator 731 is rotated counterclockwise in FIGS. 5A and 5B. In FIGS. 5A and 5B, the document receiving member 601 is illustrated such that it extends substantially horizontally for convenience. However, in practice, the document receiving member 601 is arranged obliquely at a small angle such that the distal end portion 601*b* is shifted upward, as illustrated in FIG. 3.

Figure 6A:
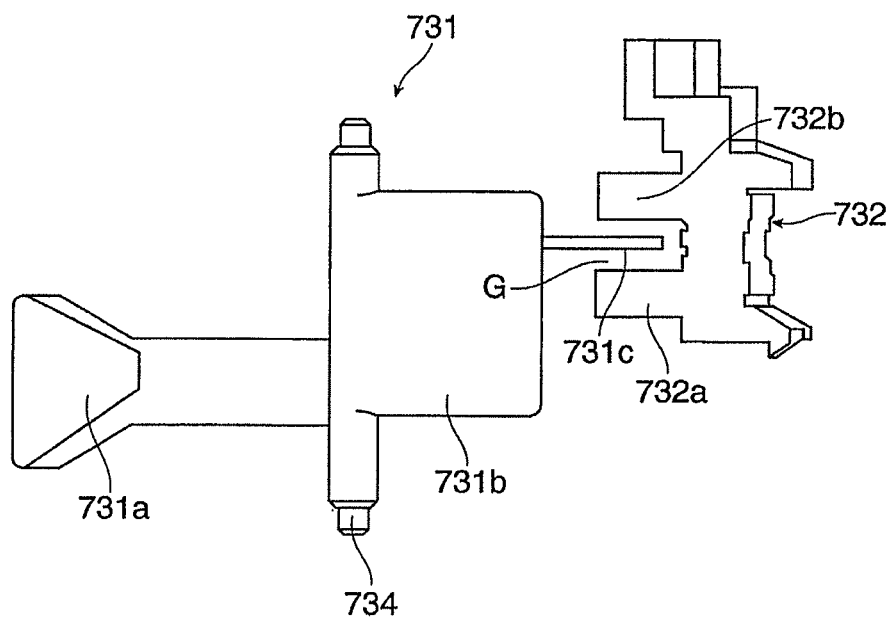
FIG. 6A is a plan view of a first actuator and FIG. 6B is a front view of the first actuator.
Figure 6B:
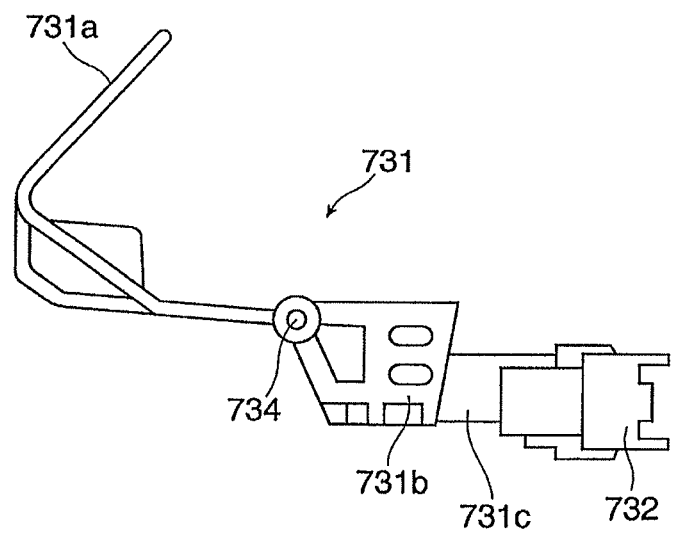

FIGS. 6A and 6B illustrate the structure of the first actuator 731. The weight and length (shape) of each of the distal end portion 731*a* and a proximal end portion 731*b* around the fulcrum 734 are adequately set so that the first actuator 731 extends substantially horizontally when no document sheets 6 are received by the document receiving member 601. The first actuator 731 extends substantially horizontally also when the document receiving member 601 is opened.

The first optical sensor 732 is fixed to the back side of the document receiving member 601 at a position corresponding to the position of a light blocking plate 731c provided on the proximal end portion 731b of the first actuator 731. The first optical sensor 732 includes a light emitting element, such as an LED, arranged on a first portion 732a, and a light receiving element, such as a phototransistor, arranged on a second portion 732b such that a gap G that allows the light blocking plate 731c of the first actuator 731 to move therethrough is provided between the light emitting element and the light receiving element. Light is emitted from the light emitting element, and is received by the light receiving element. The first optical sensor 732 detects whether or not the document sheets 6 are present based on whether or not the light is blocked by the light blocking plate 731c of the first actuator 731.

When the document sheets 6 are not present, as illustrated in FIG. 5A, the rotational position of the first actuator 731 around the fulcrum 734 is such that the first actuator 731 extends substantially horizontally, and the light blocking plate 731c of the first actuator 731 blocks the light emitted from the light emitting element of the first optical sensor 732. Accordingly, it is detected that the document sheets 6 are not present ("0" is output as an output signal). When the document sheets 6 are present, as illustrated in FIG. 5B, the distal end portion 731a of the first actuator 731 is pressed downward by the document sheets 6 received by the document receiving member 601, so that the first actuator 731 is rotated counterclockwise in FIG. 5B and the light blocking plate 731c is moved away from the light-blocking position for the first optical sensor 732. Accordingly, the light receiving element arranged on the second portion 732b receives the light emitted from the light emitting element, and it is detected that the document sheets 6 are present ("1" is output as an output signal).

Figure 7A:
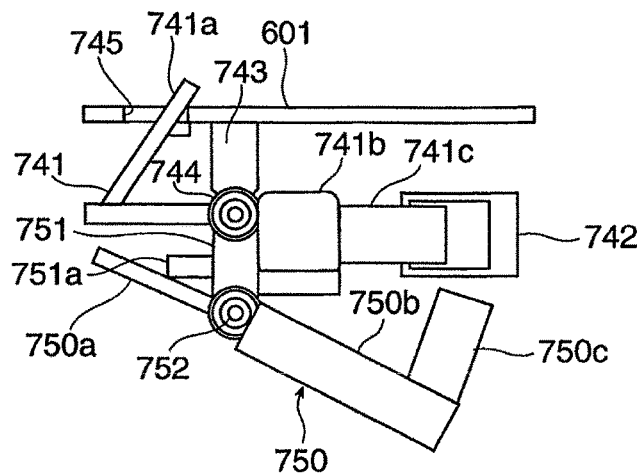
FIGS. 7A to 7C illustrate the structure of a portion of the paper receiving device according to the exemplary embodiment of the present invention.
Figure 7B:
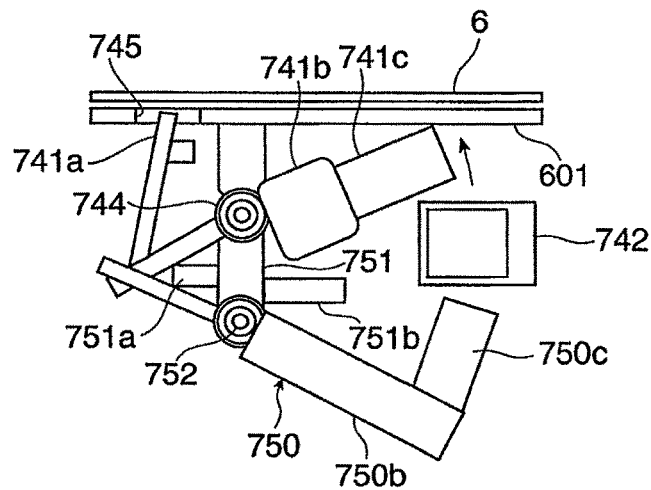
Figure 7C:
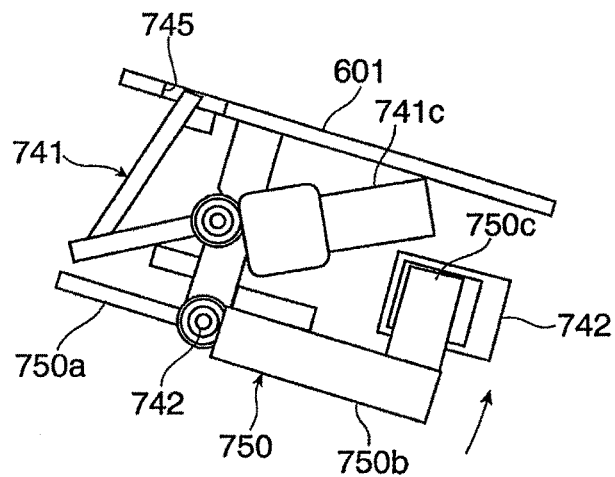

As illustrated in FIGS. 7A to 7C, the second size detection sensor 74 includes a second actuator 741, which serves as a displacement member that moves when it comes into contact with the document sheets 6 received by the document receiving member 601, and a second optical sensor 742, which is an example of a detection member that optically detects the position of the second actuator 741.

The second actuator 741 is attached to a support member 743, which is fixed to the back side of the document receiving member 601, such that the second actuator 741 is rotatable around a fulcrum 744. In the state in which no document sheets 6 are received by the document receiving member 601, a distal end portion 741a of the second actuator 741 slightly projects from an opening 745 formed in the document receiving member 601. In the state in which the document sheets 6 are received by the document receiving member 601, the distal end portion 741a comes into contact with the back side of the stack of document sheets 6 on the document receiving member 601 and is pushed downward, and thereby the second actuator 741 is rotated counterclockwise in FIGS. 7A to 7C. In FIGS. 7A to 7C, the document receiving member 601 is illustrated such that it extends substantially horizontally for convenience. However, in practice, the document receiving member 601 is arranged obliquely at a small angle such that the distal end portion 601b is shifted upward, as illustrated in FIG. 3.

Referring to FIGS. 6A and 6B, the second actuator 741 has a structure similar to that of the first actuator 731. More specifically, the weight and length (shape) of each of the distal end portion 741a and a proximal end portion 741b around the fulcrum 744 are adequately set so that the second actuator 741 extends substantially horizontally when no document sheets 6 are received by the document receiving member 601. The second actuator 741 extends substantially horizontally also when the duplex automatic document feeder (DADF) 33 is opened.

Figure 8:
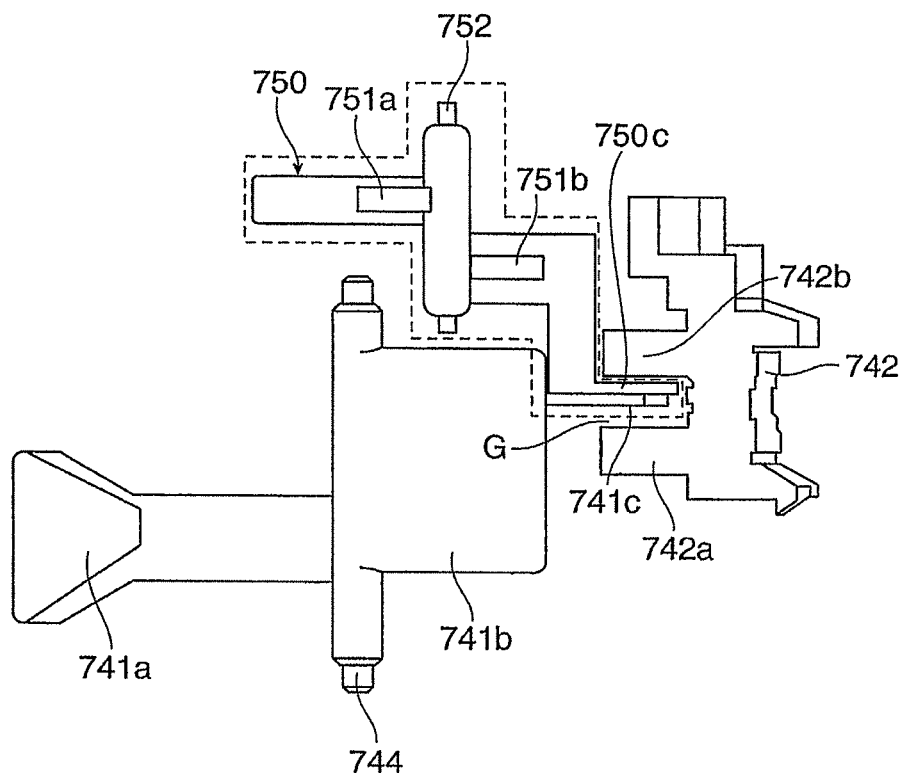
FIG. 8 illustrates the structure of a portion of the paper receiving device according to the exemplary embodiment of the present invention.

As illustrated in FIG. 8, the second optical sensor 742 is fixed to the back side of the document receiving member 601 at a position corresponding to the position of a light blocking plate 741c provided on the proximal end portion 741b of the second actuator 741. The second optical sensor 742 includes a light emitting element (not shown), such as an LED, arranged on a first portion 742a, and a light receiving element (not shown), such as a phototransistor, arranged on a second portion 742b such that a gap G that allows the light blocking plate 741c of the second actuator 741 to move therethrough is provided between the light emitting element and the light receiving element. Light is emitted from the light emitting element, and is received by the light receiving element. The second optical sensor 742 detects whether or not the document sheets 6 are present based on whether or not the light is blocked by the light blocking plate 741c of the second actuator 741.

When the document sheets 6 are not present, as illustrated in FIG. 7A, the rotational position of the second actuator 741 around the fulcrum 744 is such that the second actuator 741 extends substantially horizontally, and the light blocking plate 741c of the second actuator 741 blocks the light emitted from the light emitting element of the second optical sensor 742. Accordingly, it is detected that the document sheets 6 are not present ("0" is output as an output signal). When the document sheets 6 are present, as illustrated in FIG. 7B, the distal end portion 741a of the second actuator 741 is pressed downward by the document sheets 6 received by the document receiving member 601, so that the second actuator 741 is rotated counterclockwise in FIG. 7B and the light blocking plate 741c is moved away from the light-blocking position for the second optical sensor 742. Accordingly, the light receiving element arranged on the second portion 742b receives the light emitted from the light emitting element, and it is detected that the document sheets 6 are present ("1" is output as an output signal).

In addition, in the present exemplary embodiment, as illustrated in FIGS. 7A to 7C, a third actuator 750 is provided as an example of an open-state detector for the document receiving member 601. The third actuator 750 moves when the document receiving member 601 is opened or closed in response to an opening/closing movement of the duplex automatic document feeder (DADF) 33 relative to the housing 31 of the image reading device 3. When the duplex automatic document feeder (DADF) 33 is opened, the third actuator 750 detects that the duplex automatic document feeder (DADF) 33 is opened by changing the detection result of the second size detection sensor 74 on the document receiving member 601.

As illustrated in FIGS. 7A to 7C, the third actuator 750 is attached to a support member 751, which is fixed to the back side of the document receiving member 601, such that the third actuator 750 is rotatable around a fulcrum 752. The third actuator 750 is configured such that, when the duplex automatic document feeder (DADF) 33 is closed, the weight of a proximal end portion 750b thereof is greater than that of a distal end portion 750a thereof, and a light blocking plate 750c provided on the proximal end portion 750b is separated from the second optical sensor 742 irrespective of whether the document sheets 6 are on the document receiving member 601. The support member 751, which is fixed to the back side of the document receiving member 601, is provided with a first restricting portion 751a that restricts the position of the third actuator 750.

As illustrated in FIG. 7C, when the duplex automatic document feeder (DADF) 33 is opened, the third actuator 750 rotates counterclockwise in response to a movement of the center of gravity thereof caused by an opening movement of the document receiving member 601, and the light blocking plate 750c provided on the proximal end portion 750b blocks the light in the second optical sensor 742. The support member 751, which is fixed to the back side of the document receiving member 601, is also provided with a second restricting portion 751b that restricts the counterclockwise movement of the third actuator 750.

When the duplex automatic document feeder (DADF) 33 is opened, as illustrated in FIG. 7C, the second optical sensor 742, which is fixed to the back side of the document receiving member 601, moves to a position corresponding to the position of the document receiving member 601 that has been tilted in response to the opening movement of the duplex automatic document feeder (DADF) 33. In this state, as described above, the light blocking plate 750c provided on the proximal end portion 750b of the third actuator 750 blocks the light that travels toward the second optical sensor 742.

Figure 9:
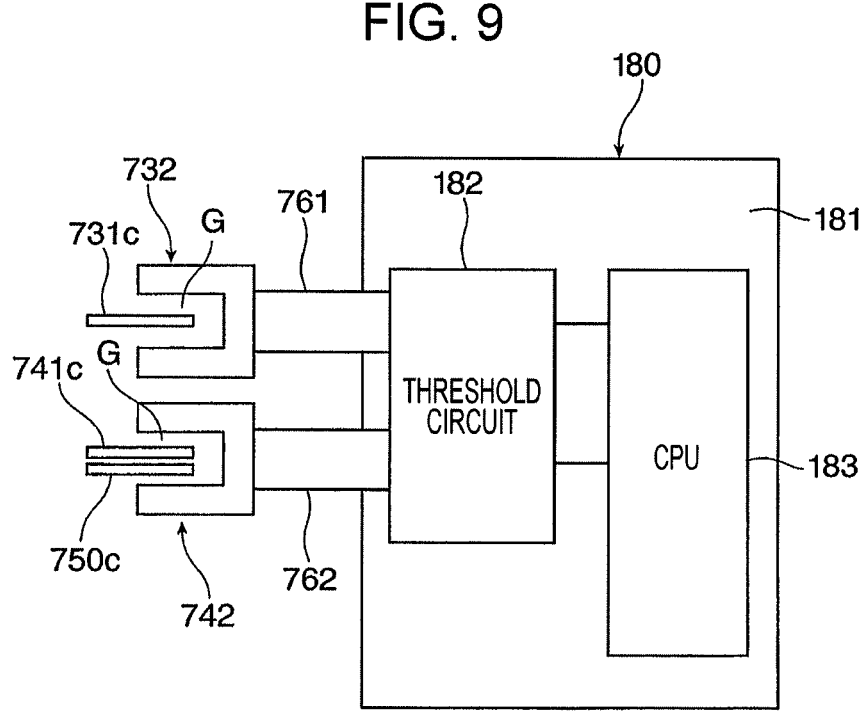
FIG. 9 is a block diagram of a control circuit of the image reading device.

As illustrated in FIG. 9, output signals from the first and second optical sensors 732 and 742 included in the first and second size detection sensors 73 and 74, respectively, are input to a threshold circuit 182 on a circuit board 181 of a control device 180 through harnesses 761 and 761, and are input to a central processing unit (CPU) 183, which functions as a control unit, from the threshold circuit 182. The threshold circuit 182 compares the signals output from the first and second optical sensors 732 and 742 with predetermined thresholds, and outputs "0" when the signals output from the first and second optical sensors 732 and 742 are smaller than predetermined thresholds and outputs "1" when the signals output from the first and second optical sensors 732 and 742 are greater than or equal to the predetermined thresholds. The CPU 183 determines whether or not the duplex automatic document feeder (DADF) 33 is opened and the size of the document sheets 6 on the document receiving member 601 on the basis of the signals input from the threshold circuit 182.

Operation of Image Reading Device

The image reading device 3 according to the present exemplary embodiment determines whether or not the duplex automatic document feeder (DADF) 33 is opened and the size of the document sheets 6 on the document receiving member 601 as follows.

Figure 10:
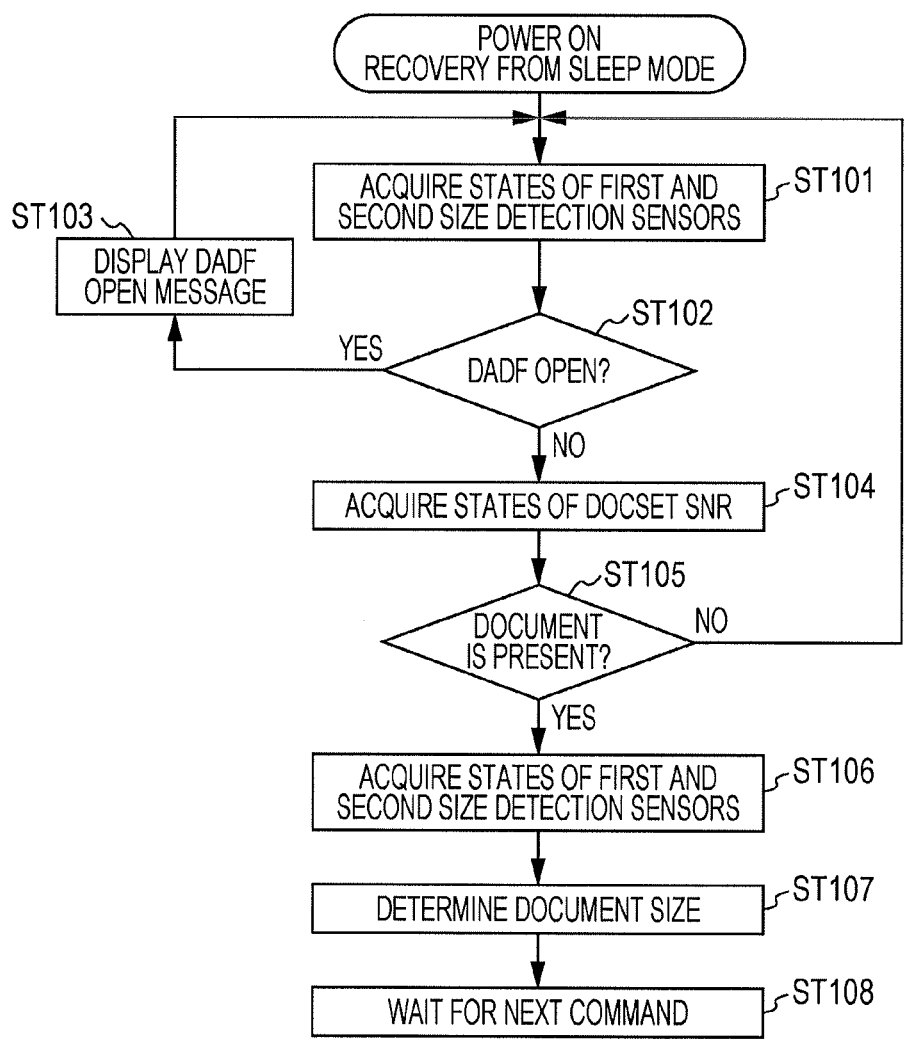
FIG. 10 is a flowchart of an operation of the image forming apparatus including the paper receiving device according to the exemplary embodiment of the present invention.

That is, as illustrated in FIG. 10, when the image forming apparatus 1 is turned on or recovers from the sleep mode, the CPU 183 receives the output states of the first and second optical sensors 732 and 742 included in the first and second size detection sensors 73 and 74 through the threshold circuit 182 (Step 101), and determines whether or not the duplex automatic document feeder (DADF) 33 is opened (Step 102).

At this time, referring to FIG. 11, the CPU 183 determines whether or not the duplex automatic document feeder (DADF) 33 is opened on the basis of the output states ("0" or "1") of the first and second optical sensors 732 and 742 included in the first and second size detection sensors 73 and 74. When the output state from the first optical sensor 732 of the first size detection sensor 73 is "1" and the output state from the second optical sensor 742 of the second size detection sensor 74 is "0", it is determined that the duplex automatic document feeder (DADF) 33 is opened. In this case, a message saying that the duplex automatic document feeder (DADF) 33 is opened is displayed on the touch panel 102 of the control panel 101 (Step 103) to prompt the user to close the duplex automatic document feeder (DADF) 33. Then, the CPU 183 returns to Step 101.

When it is determined that the duplex automatic document feeder (DADF) 33 of the image reading device 3 is closed, the CPU 183 receives the output states as those of a document set sensor of the duplex automatic document feeder (DADF) 33 (Step 104), and determines whether or not the document sheets 6 are on the document receiving member 601 of the duplex automatic document feeder (DADF) 33 (Step 105).

Figure 12:
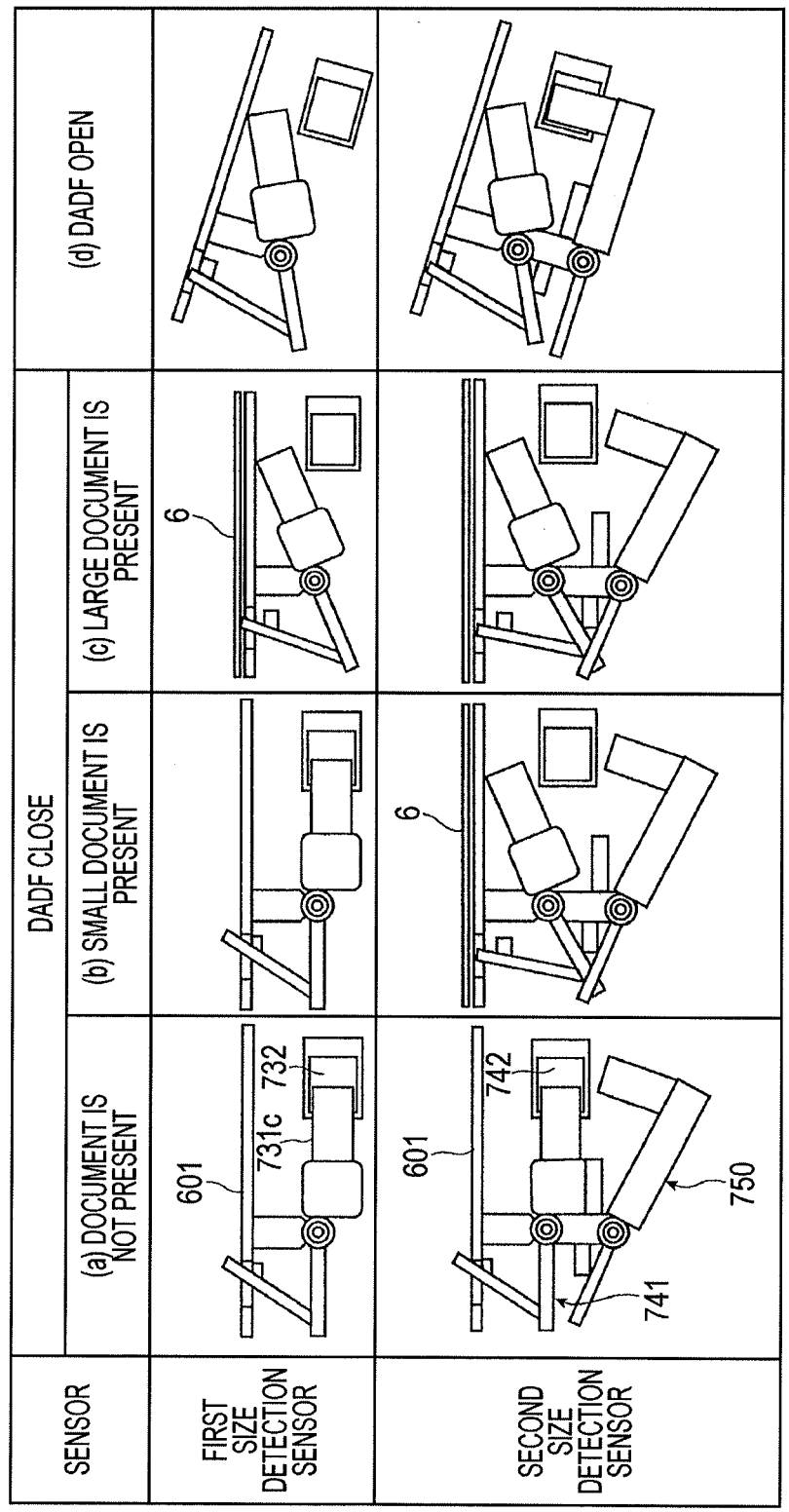
FIG. 12 is a diagram illustrating the operation of the image forming apparatus including the paper receiving device according to the exemplary embodiment of the present invention.

Referring FIG. 11 and column (a) of FIG. 12, when the outputs of the first and second optical sensors 732 and 742 of the first and second size detection sensors 73 and 74 correspond to the state in which the first and second actuators 731 and 741 are present (outputs are "0"), the CPU 183 determines that no document sheets 6 are on the document receiving member 601 of the duplex automatic document feeder 33, that is, that the document sheets 6 are not present.

Referring to FIG. 11 and columns (b) and (c) of FIG. 12, when the output of only the first optical sensor 732 of the first size detection sensor 73 corresponds to the state in which the first actuator 731 is present (output is "0"), or when the outputs of the first and second optical sensors 732 and 742 of the first and second size detection sensors 73 and 74 correspond to the state in which the first and second actuators 731 and 741 are not present (outputs are "1"), the CPU 183 determines that the document sheets 6 are on the document receiving member 601 of the duplex automatic document feeder 33.

When it is determined that the document sheets 6 are present, the CPU 183 acquires the output states of the first and second optical sensors 732 and 742 of the first and second size detection sensors 73 and 74. (Step 106), and determines the size of the document sheets 6 (Step 107). Then, the CPU 183 waits for the next command (Step 108). When it is determined that the document sheets 6 are not present, the CPU 183 returns to Step 101.

Referring to FIG. 11 and column (b) of FIG. 12, when the output of only the first optical sensor 732 of the first size detection sensor 73 corresponds to the state in which the first actuator 731 is present (output is "0"), the CPU 183 determines that the size of the document sheets 6 on the document receiving member 601 of the duplex automatic document feeder 33 is small.

Referring to FIG. 11 and column (c) of FIG. 12, when the outputs of the first and second optical sensors 732 and 742 of the first and second size detection sensors 73 and 74 correspond to the state in which the first and second actuators 731 and 741 are not present (outputs are both "1"), the CPU 183 determines that the size of the document sheets 6 on the document receiving member 601 of the duplex automatic document feeder 33 is large.

In the above-described exemplary embodiment, whether the duplex automatic document feeder (DADF) 33 is opened or closed is detected by using only the first and second size detection sensors 73 and 74 for detecting the size of the document sheets 6. Therefore, compared to the case in which a dedicated opened/closed state detector for detecting whether the duplex automatic document feeder (DADF) 33 is opened or closed is provided, whether the duplex automatic document feeder (DADF) 33 (document receiving member 601) is opened or closed may be detected with a smaller number of components.

In the above-described exemplary embodiment, the document receiving member of the image reading device is described as an example of a paper receiving device. However, the present invention is, of course, not limited to this, and may instead be applied to a paper receiving device such as a manual feed tray that is provided on the image forming apparatus such that the manual feed tray may be opened or closed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A paper receiving device comprising:
a paper receiving member that receives a paper sheet;
a first detector that detects whether or not a size of the paper sheet received by the paper receiving member is greater than a first size;
a second detector that detects whether or not the size of the paper sheet received by the paper receiving member is smaller than a second size that is smaller than the first size; and
an open-state detector that detects that the paper receiving device is opened when the first detector detects that the size of the paper sheet is greater than the first size and the second detector detects that the size of the paper sheet is smaller than the second size, wherein
the open-state detector detects that the paper receiving device is opened by changing a detection result of the second detector in response to an opening-closing movement of the paper receiving device,
the opening-closing movement is a movement in which the paper receiving device is opened or closed by being rotated around a fulcrum, and the second detector includes an actuator and a sensor, and
the open-state detector is configured such that when the paper receiving device is opened or closed, the actuator is displaced owing to a weight of the actuator so that a detection result of the sensor is changed.

2. The paper receiving device according to claim 1, wherein the first and second detectors each include a displacement member that is displaced when the displacement member comes into contact with the paper sheet received by the paper receiving member, and a detection member that optically detects a position of the displacement member.

3. The paper receiving device according to claim 2, wherein, when the paper receiving device is opened and when neither of the detection members of the first and second detectors detects the corresponding displacement member, the open-state detector moves to a position where the detection member of the second detector detects the open-state detector.

4. The paper receiving device according to claim 1, wherein the first detector includes a first actuator that is displaced depending on presence or absence of the paper sheet received by the paper receiving member, and
a first sensor that detects a state indicating presence of the paper sheet or a state indicating absence of the paper sheet on the basis of the displacement of the first actuator, and
wherein the second detector includes
a second actuator that is displaced depending on presence or absence of the paper sheet received by the paper receiving member, and
a second sensor that detects a state indicating presence of the paper sheet or a state indicating absence of the paper sheet on the basis of the displacement of the second actuator.

5. The paper receiving device according to claim 4,
wherein the second detector further includes
a third actuator that is displaced when the paper receiving member is rotated,
wherein the first actuator is configured such that, when the paper receiving member is rotated, the first actuator is displaced from a position in the state indicating absence of the paper sheet to a position in the state indicating presence of the paper sheet,
wherein the second and third actuators are configured such that, when the paper receiving member is rotated, the state indicating absence of the paper sheet is maintained, and
wherein the open-state detector detects that the paper receiving device is opened when the first sensor detects the state indicating presence of the paper sheet and the second sensor detects the state indicating absence of the paper sheet.

6. An image reading device comprising:
the paper receiving device according to claim 1;
a document transporting unit that transports a document received by the paper receiving device to a reading position; and
an image reading unit that reads an image on the document transported by the document transporting unit.

7. An image forming apparatus comprising:
the image reading device according to claim 6; and
an image forming unit that forms the image of the document read by the image reading device.

8. A paper receiving device comprising:
a paper receiving member that receives a paper sheet;
a first detector that detects presence or absence of the paper sheet received by the paper receiving member;
a second detector that is closer to a paper feeding side of the paper receiving member than the first detector is and that detects presence or absence of the paper sheet received by the paper receiving member; and
an open-state detector that detects that the paper receiving device is opened when the first detector detects that the paper sheet is present and the second detector detects that the paper sheet is absent, wherein
the open-state detector detects that the paper receiving device is opened by changing a detection result of the second detector in response to an opening-closing movement of the paper receiving device,
the opening-closing movement is a movement in which the paper receiving device is opened or closed by being rotated around a fulcrum, and the second detector includes an actuator and a sensor, and
the open-state detector is configured such that, when the paper receiving device is opened or closed, the actuator is displaced owing to a weight of the actuator so that a detection result of the sensor is changed.

9. The paper receiving device according to claim 8, wherein the first and second detectors each include a displacement member that is displaced when the displacement member comes into contact with the paper sheet received by the paper receiving member, and a detection member that optically detects a position of the displacement member.

10. The paper receiving device according to claim 9, wherein, when the paper receiving device is opened and when neither of the detection members of the first and second detectors detects the corresponding displacement member, the open-state detector moves to a position where the detection member of the second detector detects the open-state detector.

11. The paper receiving device according to claim 8, wherein the first detector includes
    a first actuator that is displaced depending on presence or absence of the paper sheet received by the paper receiving member, and
    a first sensor that detects a state indicating presence of the paper sheet or a state indicating absence of the paper sheet on the basis of the displacement of the first actuator, and
wherein the second detector includes
    a second actuator that is displaced depending on presence or absence of the paper sheet received by the paper receiving member, and
    a second sensor that detects a state indicating presence of the paper sheet or a state indicating absence of the paper sheet on the basis of the displacement of the second actuator.

12. The paper receiving device according to claim 11, wherein the second detector further includes
    a third actuator that is displaced when the paper receiving member is rotated,
wherein the first actuator is configured such that, when the paper receiving member is rotated, the first actuator is displaced from a position in the state indicating absence of the paper sheet to a position in the state indicating presence of the paper sheet,
wherein the second and third actuators are configured such that, when the paper receiving member is rotated, the state indicating absence of the paper sheet is maintained, and
wherein the open-state detector detects that the paper receiving device is opened when the first sensor detects the state indicating presence of the paper sheet and the second sensor detects the state indicating absence of the paper sheet.

13. An image reading device comprising:
the paper receiving device according to claim 8;
a document transporting unit that transports a document received by the paper receiving device to a reading position; and
an image reading unit that reads an image on the document transported by the document transporting unit.

14. An image forming apparatus comprising:
the image reading device according to claim 13; and
an image forming unit that forms the image of the document read by the image reading device.

* * * * *